(No Model.)
J. STEVENS.
CALIPERS OR DIVIDERS.
No. 432,578. Patented July 22, 1890.
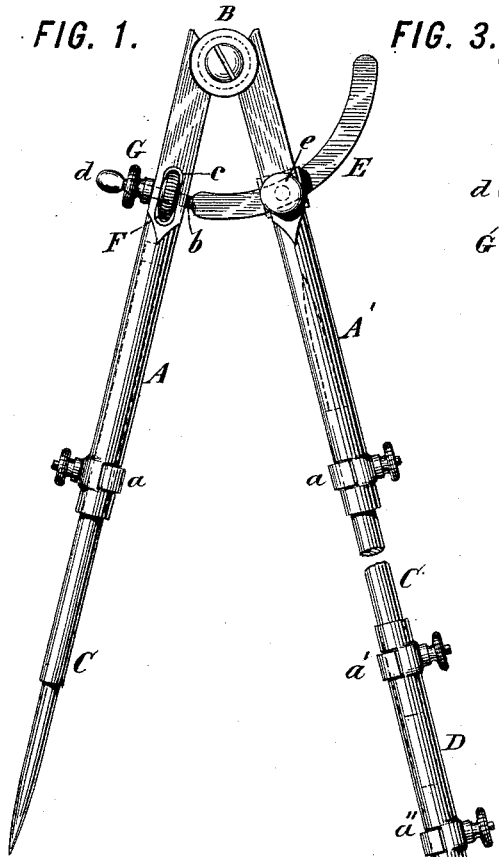
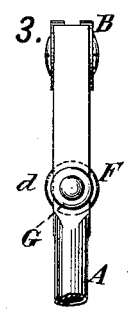
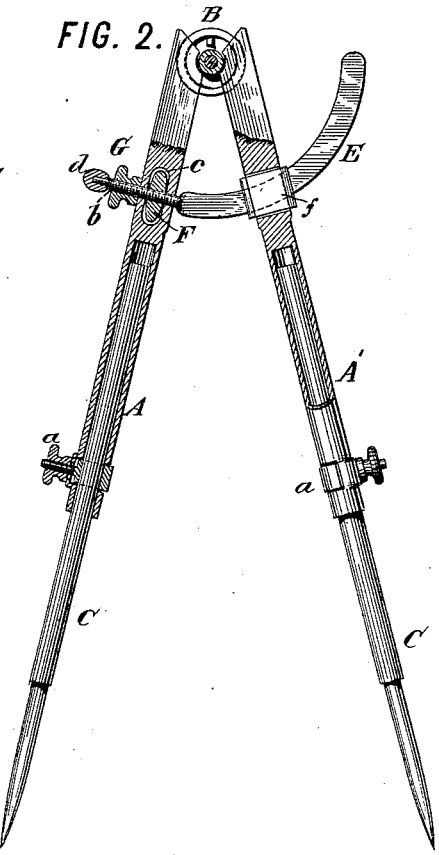
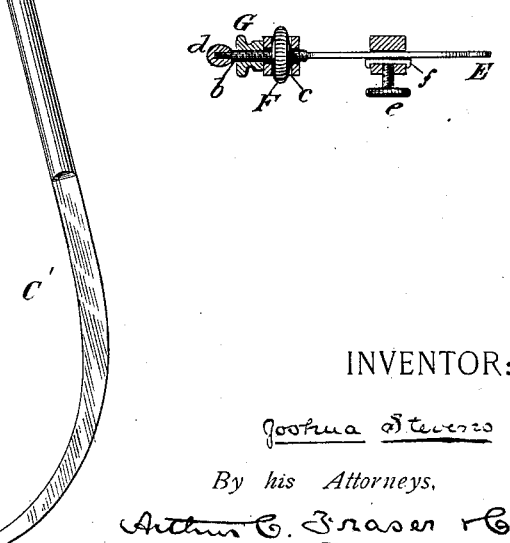
WITNESSES:
John Becker
C. K. Fraser.
INVENTOR:
Joshua Stevens
By his Attorneys,
Arthur C. Fraser & Co.
THE NORRIS PETERS CO., PHOTO-LITHO., WASHINGTON, D. C.

UNITED STATES PATENT OFFICE.

JOSHUA STEVENS, OF CHICOPEE FALLS, MASSACHUSETTS, ASSIGNOR TO THE J. STEVENS ARMS AND TOOL COMPANY, OF SAME PLACE.

CALIPERS OR DIVIDERS.

SPECIFICATION forming part of Letters Patent No. 432,578, dated July 22, 1890.

Application filed December 20, 1889. Serial No. 334,431. (No model.)

*To all whom it may concern:*

Be it known that I, JOSHUA STEVENS, a citizen of the United States, residing at Chicopee Falls, in the State of Massachusetts, have invented certain new and useful Improvements in Calipers or Dividers, of which the following is a specification.

This invention relates to dividers or calipers of that class wherein the legs are connected through the medium of an arc-shaped brace or wing attached to one of the legs, and to which the other may be clamped in any position in order to set the legs firmly when opened to any desired extent.

The object of the invention is to improve the construction of such calipers with special reference to the adjustable connection of the wing to the leg to which its end is fastened.

Figure 1 of the accompanying drawings is an elevation of dividers or calipers embodying my invention. Fig. 2 is a similar view partly in section. Fig. 3 is a fragmentary side or edge view of the upper portion of the dividers. Fig. 4 is a transverse section thereof cut parallel to the arc-shaped wing.

The two legs A A' of the dividers or calipers are pivoted together at the head B in any known or suitable way, and are provided with points in the case of dividers, or with curved or other jaws in case the instrument is calipers, according to any known method of construction. Preferably separate points C C are employed for dividers, the legs A A' being made tubular and the shanks of these points thrust into them and fastened by clamps or set-screws $a\ a$, as shown in Fig. 2; or curved caliper-jaws C' may be substituted for the divider-points. To lengthen the instrument, a tubular sleeve D may be applied to each leg by slipping its one end over one of the points C and clamping it thereon by a clamp or set-screw $a'$, and thrusting a caliper-leg C' or a divider-point or other usual accessory of such instruments into the other end of the sleeve and fastening it by a clamp $a''$, as shown with reference to the right-hand leg in Fig. 1. These details, however, are immaterial to my invention.

An arc-shaped or straight brace or "wing" E is provided to connect the two legs A A', in order that they may be clamped together at any angle. One end of this wing is formed as a cylindrical stem $b$, which is screw-threaded, and which passes freely through a round hole drilled through the leg A. A recess $c$ is formed in this leg, in which fits closely a disk-shaped thumb-nut F, the internal threads of which engage the threads on the stem $b$, as best shown in Figs. 2 and 4, and the milled periphery of which projects beyond the opposite sides of the leg sufficiently to enable the nut to be turned by the fingers. The end of the screw-stem $b$ projects entirely through and beyond the leg A, and on its projecting portion is screwed a set-nut G. On the extreme end of the stem is fixed a button or head $d$, which prevents the escape of the nut G.

The arc-shaped portion of the wing E is made flat, and passes through a recess or slot cut in the leg A'. This leg is provided with any suitable means for clamping it to the wing—such, for example, as a set-screw $e$, acting against a gib $f$, as shown in Fig. 4—this being a well-known expedient for the purpose.

In order to set the dividers or calipers to any given measurement, the screw $e$ is loosened and the legs opened or closed to approximately the proper relative position, whereupon they are set by tightening the screw $e$. Any fine adjustment necessary is afterward made by first loosening the set-nut G and then turning the nut F, in order thereby to propel the screw $b$ in one direction or the other through its hole in the leg A, and thereby to move this leg toward or from the leg A.' When the required adjustment has been obtained, the set-nut G is screwed up, in order to take up any possible looseness or lost motion.

My invention provides a very simple construction for securing the coarse and fine adjustments of the dividers or calipers, and one which is free from springs or elastic connections of any kind, and can be adjusted with great nicety and in a firm and unyielding manner to any measurement.

I claim as my invention the following defined novel features, substantially as hereinbefore specified, namely:

1. In dividers or calipers, the combination, with the two legs pivoted together, of a wing or brace formed with a screw-threaded end passing through one of the legs, an adjusting-nut screwing on said threaded end and working in a recess in said leg, and the other leg provided with means for clamping it to said wing.

2. The combination of the leg A, formed with a hole through it, and with a recess $c$ intersecting said hole, the leg A', the arc-shaped wing E, having a screw-threaded end $b$, passing through said hole in the leg A, a thumb-nut F, working in said recess $c$ and engaging said threaded end, a set-nut G, screwing on said threaded end against the leg A, and means for clamping the leg A' to the wing.

In witness whereof I have hereunto signed my name in the presence of two subscribing witnesses.

JOSHUA STEVENS.

Witnesses:
JAMES H. LOOMIS,
GEORGIE E. PAGE.